United States Patent [19]

Bushwood et al.

[11] Patent Number: 5,052,634

[45] Date of Patent: Oct. 1, 1991

[54] STATIC TAPE CASSETTE REEL LOCK

[75] Inventors: Timothy Bushwood, Windham, Me.; Alan Lowry, Canton, Mass.; Craig Lovecky, Old Orchard Beach, Me.

[73] Assignee: Shape Inc., Biddeford, Me.

[21] Appl. No.: 471,648

[22] Filed: Jan. 29, 1990

[51] Int. Cl.$^5$ .............................................. G11B 23/04
[52] U.S. Cl. .................................................... 242/198
[58] Field of Search ............................... 242/197-200; 360/132

[56] References Cited

U.S. PATENT DOCUMENTS

| | | | |
|---|---|---|---|
| 3,900,172 | 8/1975 | Kamaya | 242/198 |
| 4,050,087 | 9/1977 | Kishi | 360/96 |
| 4,093,151 | 6/1978 | Karsh | 242/198 |
| 4,106,724 | 8/1978 | Higashida | 242/198 |
| 4,214,719 | 7/1980 | Kata | 242/198 |
| 4,225,100 | 9/1980 | Sugawara | 242/198 |
| 4,232,840 | 11/1980 | Sugawara | 242/198 |
| 4,288,048 | 9/1981 | Sieben | 242/198 |
| 4,290,567 | 9/1981 | Saito | 242/198 |
| 4,320,430 | 3/1982 | Vogt | 360/133 |
| 4,372,504 | 2/1983 | Shibata et al. | 242/198 |
| 4,419,708 | 12/1983 | Ogiro et al. | 360/132 |
| 4,428,548 | 1/1984 | Gotoh | 242/199 |
| 4,447,020 | 5/1984 | Toi et al. | 242/198 |
| 4,449,677 | 5/1984 | Ohta et al. | 242/199 |
| 4,463,918 | 8/1984 | Takagi | 242/199 |
| 4,470,560 | 9/1984 | Yoneya et al. | 242/198 |
| 4,472,753 | 9/1984 | Wulfing | 360/132 |
| 4,475,700 | 10/1984 | MacLeod, Jr. et al. | 242/198 |
| 4,482,104 | 11/1984 | Saito | 242/198 |
| 4,484,248 | 11/1984 | Ogiro et al. | 360/132 |
| 4,638,393 | 1/1987 | Oishi et al. | 242/198 X |
| 4,728,056 | 3/1988 | Onmori et al. | 242/198 |
| 4,742,415 | 5/1988 | Oishi | 360/132 |
| 4,750,074 | 6/1988 | Oishi | 360/132 |
| 4,763,218 | 8/1978 | Westfall et al. | 360/132 |
| 4,765,563 | 8/1988 | Satoyoshi et al. | 242/199 |
| 4,768,122 | 8/1988 | Kawada | 360/132 |
| 4,773,614 | 9/1988 | Makino et al. | 242/199 |
| 4,801,107 | 1/1989 | Dixon et al. | 242/198 |
| 4,801,614 | 9/1988 | Makino et al. | 242/199 |
| 4,802,048 | 1/1989 | Perkins et al. | 360/132 |
| 4,807,077 | 2/1989 | Zaitsu et al. | 360/132 |
| 4,823,223 | 4/1989 | Hirose et al. | 360/133 |
| 4,824,044 | 4/1989 | Oogi | 242/198 |

FOREIGN PATENT DOCUMENTS

| | | |
|---|---|---|
| 0143592 | 11/1984 | European Pat. Off. . |
| 1340310 | 12/1973 | United Kingdom . |
| 1375240 | 11/1974 | United Kingdom . |
| 2099399 | 12/1982 | United Kingdom . |

OTHER PUBLICATIONS

VHS Video Cassette System Standard-Compact Video Cassette, May 1982.

Primary Examiner—Daniel P. Stodola
Assistant Examiner—William G. Battista, Jr.
Attorney, Agent, or Firm—Staas & Halsey

[57] ABSTRACT

A static tape cassette reel lock is described. In one embodiment a tape reel flange has on the outer circumference thereof a plurality of teeth, and the cassette base includes a plurality of slanted vertical ribs and a centered slanted horizontal rib. The teeth of the flange are able to move past the angled ribs so that the tape reel can rotate in one direction, but does not allow rotation in the other direction. In another embodiment the reel hub includes a chamfered ring of teeth. The cassette base includes a corresponding ratchet ring of ramped teeth. Again, rotation in one direction is allowed, but not in the opposite direction.

11 Claims, 4 Drawing Sheets

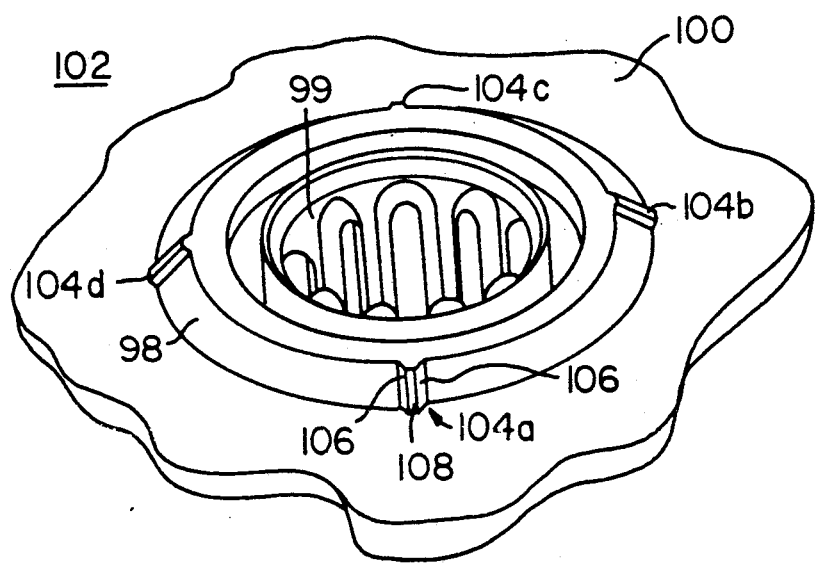
FIG. 8
FIG. 9
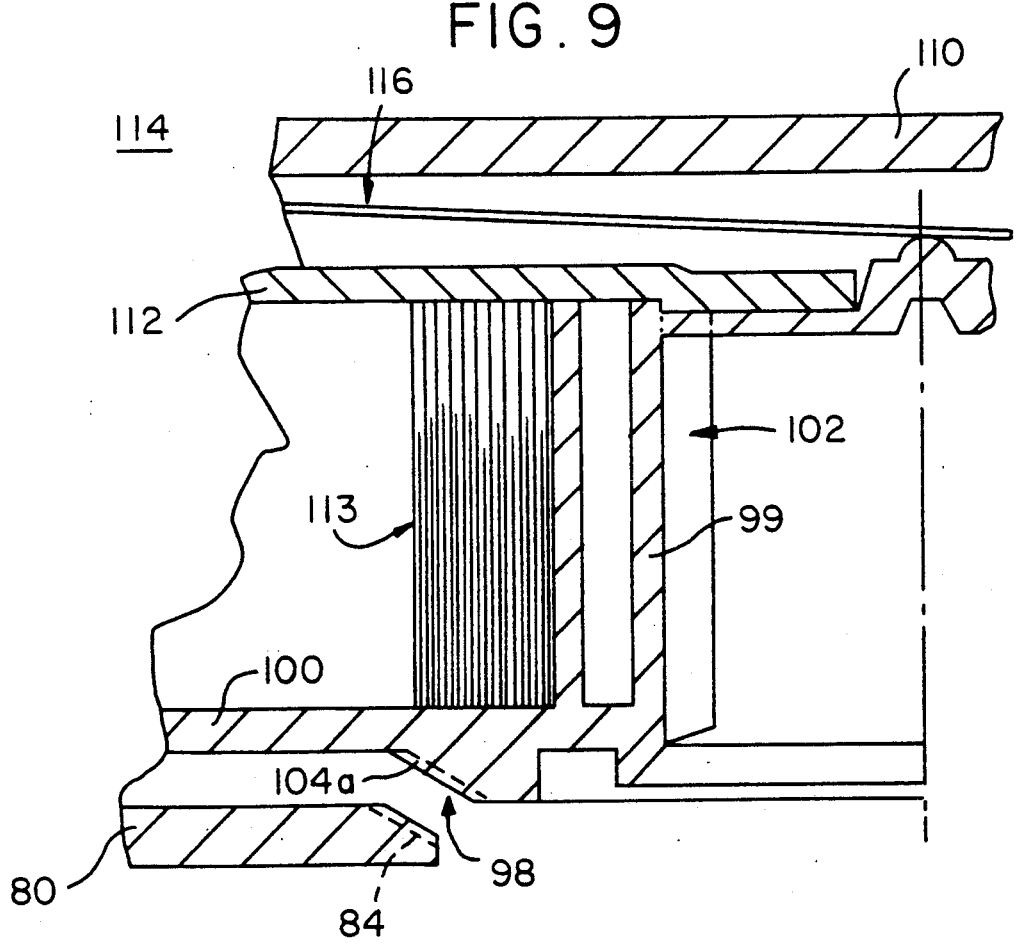

STATIC TAPE CASSETTE REEL LOCK

BACKGROUND OF THE INVENTION

This invention relates to tape cassette and, more particularly, to a device for preventing despooling of tape from reels of a video cassette when the tape cassette is not received by a tape player/recorder.

A conventional tape cassette has a relatively flat, substantially rectangular configuration, formed of a suitable plastic. The cassette includes a base and cover, each having side walls. Tape reels are usually suitably located in side-by-side relation within the cassette so as to be freely rotatable, and a magnetic tape is would on the tape reels. A reel leaf spring is attached to the cassette cover to normally bias the tape reels in the direction of the base.

Tape reel locks have been used to prevent unwanted "despooling" of the tape during shipping, handling, etc. However, such locks must disengage and allow rotation of the reels when the cassette is received by the tape player/recorder.

More particularly, when tape is wound on the reels during manufacturing, air is caught between the windings. During subsequent shipment, handling, etc., even though the reels are locked, despooling can occur, i.e., the air is squeezed out, the tape becomes more tautly wound on the reels, and excess tape accumulates between the reels at the open end of the cassette. Despooled, exposed tape can, of course, be easily damaged.

The industry has almost uniformly adopted a multipiece reel lock, such as shown and described in U.S. Pat. Nos. 4,447,020 or 4,232,840. Such multipiece reel locks include a separate actuator/retractor, a pair of separate movable arms for respectively locking the reels, and a separate spring for biasing the arms toward the reels. These reel locks are assembled in between the tape reels in walls/receptacles formed in the cassette base and are actuated by a pin of the player that protrudes through the base.

Of course, such a multipiece lock is rather expensive to produce and assemble. Further, due to the number of parts and the fabrication requirements for each part, production yields cannot be maximized Assignee's currently pending U.S. patent application Ser. No. 389,906, entitled "Video Cassette Integral Actuator/Reel Lock/Spring" provides an improved one-piece reel lock, significantly decreasing manufacturing and assembly costs, and reliably locking the reels. Notwithstanding this advance, the art still is in need of a reel lock which needs no assembly and requires no moving parts, to further simplify structure, improve quality and reliability and minimize costs.

SUMMARY OF THE INVENTION

Accordingly, it is a purpose of the present invention to provide a tape cassette which can be made at less cost.

It is another purpose of the present invention to provide a reel lock which requires no assembly into a video cassette.

It is another purpose of the present invention to provide a reel lock which lacks moving or working parts, except cooperation between the reels and the cassette, to improve reliability.

It is another purpose of the present invention to provide a reel lock which allows selective movement of the tape reels in a direction which compensates for any tape despooling or slacking.

Finally, it is a purpose of the present invention to provide a tape cassette reel lock which includes cooperating ribs and/or teeth formed on the tape reel and cassette to prevent despooling of the tape, when the cassette is not received by the tape player/recorder.

To achieve the foregoing and other purposes of the present invention, and in accordance with the purposes of the invention there is provided a static tape cassette reel lock which is formed integrally of the cassette and tape reels. In one embodiment, the tape reel lower flange has, on the outer circumference thereof, a plurality of teeth, and the cassette base includes a plurality of vertical, ramped ribs which are adjacent the flange circumference, and a horizontal, ramped rib located centrally between the tape reels. During, e.g., shipment, the teeth of the flanges are able to move past the ramps in one direction, but are prevented from rotating in the other direction. In another embodiment, the bottom of the tape reel hub includes a lower ratchet ring of ramped teeth and the cassette base includes a corresponding ring of ramped teeth. Again, rotation in one direction is allowed, but not in the opposite direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a bottom view of a tape reel hub with a chamfered locking ring formed thereon according to the second embodiment.

FIG. 9 is a side, cross sectional view of a tape reel in the unlocked position in a tape cassette according to the second embodiment.

DETAILED DESCRIPTION OF THE PREFERRED EMBODIMENTS

Preferred embodiments of the present invention will now be described with reference to FIGS. 1-9.

Figure 1:
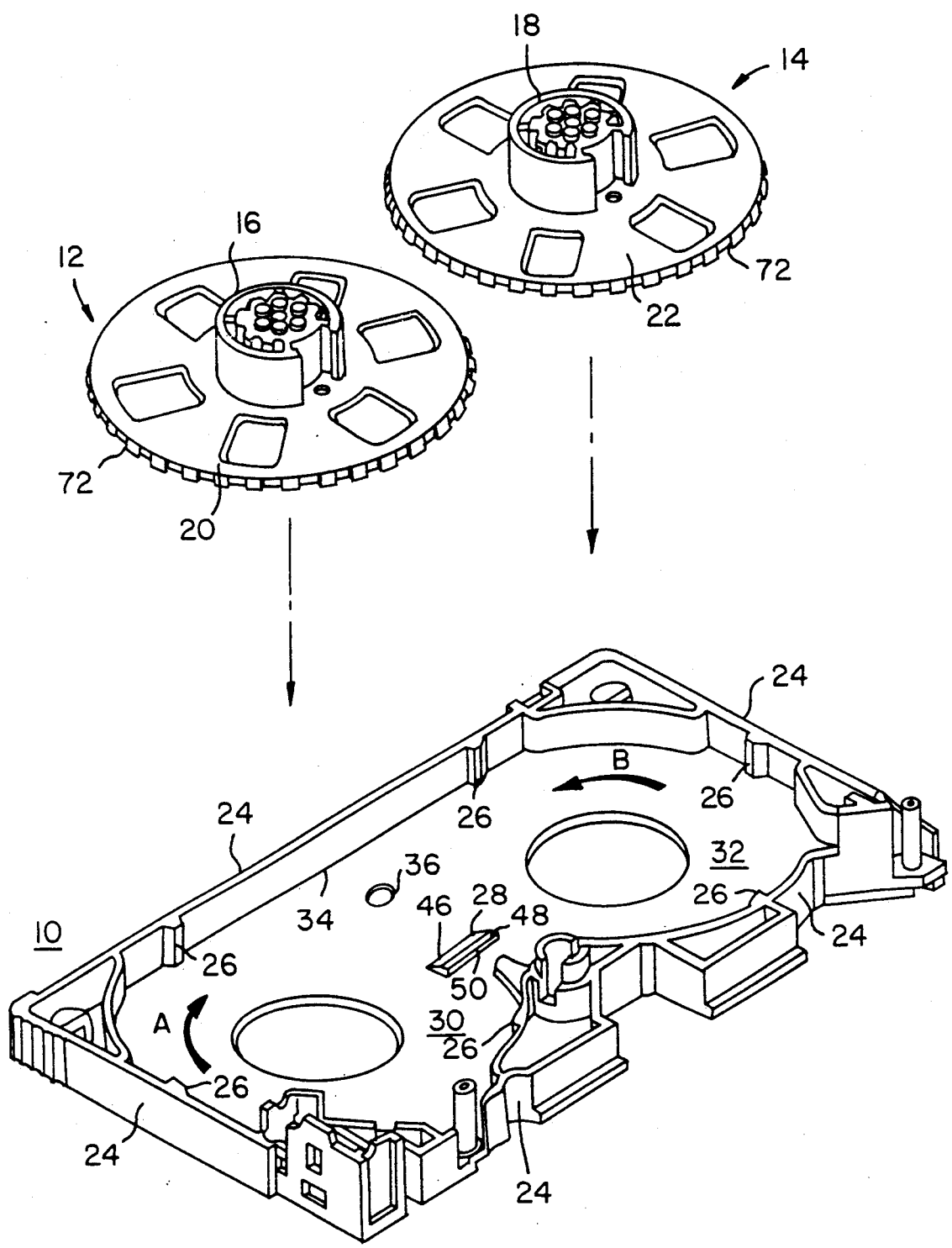
FIG. 1 is a perspective, exploded view of a first embodiment of the present invention, illustrating particularly the formation of vertical ribs and a horizontal rib on a cassette base, and tape reels, each having peripheral teeth.

FIG. 1 is a perspective, exploded view of a first embodiment according to the present invention. Shown in FIG. 1 is a substantially planar cassette base 10, a left tape reel 12 and a right tape reel 14. Each tape reel 12 and 14 includes a hub 16 and 18, and a lower flange 20 and 22, respectively. Upper flanges are not shown but, as known, are usually included in video cassette tape reels.

The base 10 includes a plurality of upstanding walls 24, some of which include a vertical rib 26. Further, located centrally of the cassette base 10 is a horizontal rib 28. FIG. 1 shows six vertical ribs 26 and one horizontal rib 28. However, any number of ribs 26, 28 could be used, as desired.

The tape reels 12 and 14 are positioned within areas 30 and 32, respectively, of the cassette base 10 and rotate in the tape take-up directions indicated by arrows "A" and "B", respectively, when moved by drive spindles of the tape player/recorder (not shown).

Figure 2:
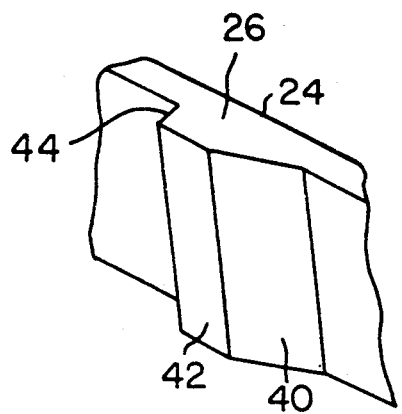
FIG. 2 is a perspective view of one of the vertical ribs shown in FIG. 1.

FIG. 2 is an enlarged view of one of the vertical ribs 26. This rib 26 includes a first, slanted surface or ramp 40, a second, flat surface 42 parallel with the wall 24 adjacent thereto and a third flat surface or ledge 44 perpendicular to the surface 42 and the wall 24.

The horizontal rib 28 shown in FIG. 1 is of a similar construction, having a first slanted surface 46, a second flat surface 48 parallel with the base 10 and a third flat surface 50 perpendicular to the base 10. The first slanted surface 46 of the horizontal rib 28 faces towards a rear 34 of the cassette base 10.

Figure 3:
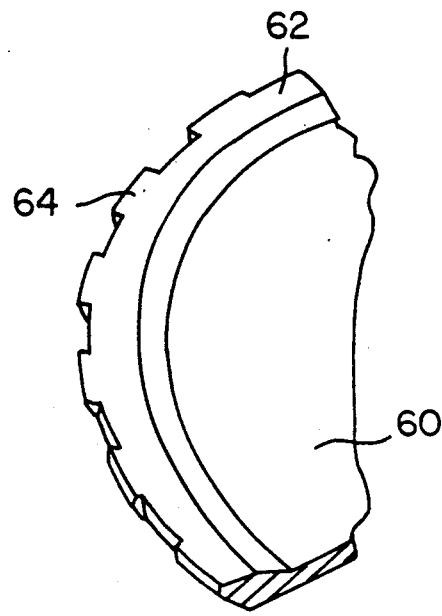
FIG. 3 is a bottom view of a conventional tape reel flange.

FIG. 3 is a perspective view of the bottom of a conventional tape reel flange 60. As can be seen, this conventional flange 60 includes a continuous circumferential skuff rib 62. Further, there is included a plurality of circumferential teeth 64 extending from the rib 62.

Figure 4:
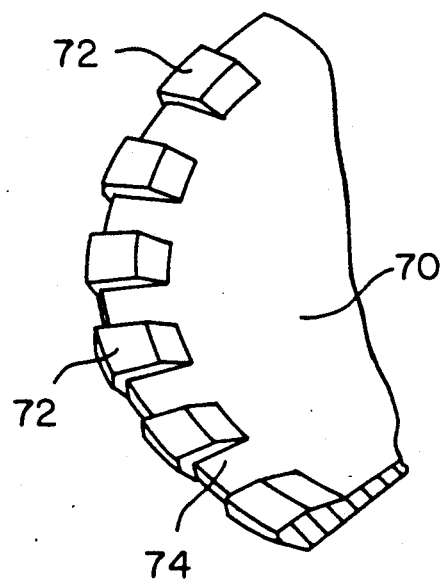
FIG. 4 is a bottom view of a tape reel flange used with the first embodiment of the present invention.

FIG. 4 illustrates the flange 70 according to the first embodiment of the present invention. Instead of the full prior art continuous circumferential skuff rib 62, the present invention includes a plurality of teeth 72 projecting beyond and below the skuff rib 74. As a result, the rib 74 is an interrupted skuff rib.

As can be seen, this static tape cassette reel lock has no moving or working parts other than the relationship between the base 10, and tape reels 12, 14.

In shipment each tape reel 12, 14 is restricted to rotate in directions A and B only. That is, the teeth 72 are able to ride across the ramp 40 in the take up directions ("A" and "B") but are restricted from moving in opposite directions by the ledge 44. If the hub flange 70 circumference is not hitting any vertical ribs 26, locking will then occur between the interrupted skuff rib 74 on the underside of the tape reels 12, 14 and the horizontal rib 28. When the tape cassette is received by a tape player/recorder, the tape reels 12, 14 are centered and lifted by the spindles of the player/recorder against the biasing force of the reel leaf spring and thus no interference to rotation is possible.

This static rib design is accomplished in the molding stage of the tape reels 12, 14 and base 10. Locking of the tape reels 12, 14 requires no additional components or assembly and adds no complexity to the molding process. This also pertains to the alternate embodiment described below. All restriction to rotation is molded directly into the base 10 and the tape reels 12, 14. Further, the tape reels 12, 14 are interchangeable. That is, there is no requirement for right or left hand tape reel designs. This of course, facilitates assembly and further reduces costs. This is true of both the static ribs described above and the alternate ratchet locks which will now be described.

Figure 5:
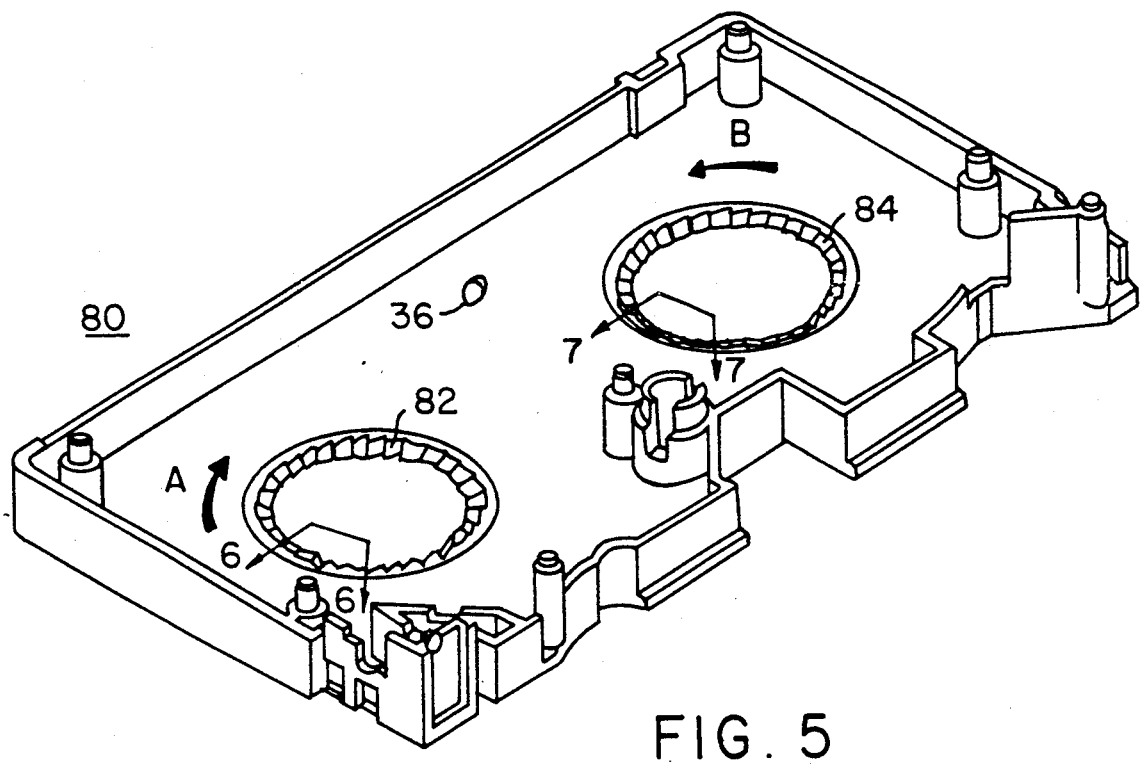
FIG. 5 is a perspective view of a second embodiment according to the present invention, illustrating particularly location of left and right ratchet rings on the cassette base.

FIG. 5 is a perspective view of a cassette base 80 according to a second embodiment of the present invention. This base 80 includes a left ratchet ring 82 and a right ratchet ring 84. Arrows "A" and "B" again indicate the tape take-up directions. Each ring 82, 84 is angled relative to the plane of the base.

Figure 6:
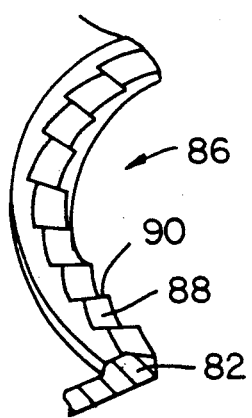
FIG. 6 is a perspective, cross sectional view of the left hand ratchet ring shown in FIG. 5.

FIG. 6 is an enlarged, cross-sectional view of the left ratchet ring 82 shown in FIG. 5. As can be seen, this left ratchet ring 82 includes a plurality of teeth 86 pointed in the clockwise direction "A". Each tooth 86 includes a first, gradually sloped surface 88, and an abruptly sloped surface 90.

Figure 7:
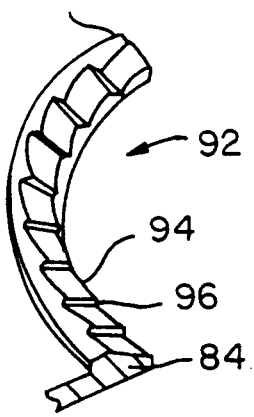
FIG. 7 is a perspective, cross sectional view of the right hand ratchet ring shown in FIG. 5.

FIG. 7 shows the right ratchet ring 84 shown in FIG. 5 which similarly includes a plurality of teeth 92 extending in the counter clockwise direction "B". Each tooth 92 also includes a first, gradually sloped surface 94 and a second abruptly sloped surface 96.

The angle of each of the first gradually sloped surfaces 88 and 94 is about 10°. There are 36 teeth in this embodiment, each spaced 10°, but any number is possible. The second abruptly sloped surfaces 90 and 96 are at about 90°. These angles are merely exemplary.

FIG. 8 is a bottom view of a chamfered locking ring 98 formed on the bottom of a hub 99 of a tape reel 102. The reason for the chamfering is to facilitate self-centering of the hub 99 in the ratchet rings 82, 84. The hub locking ring 98 is an annular projecting member including a plurality of spaced teeth 104a through 104d. Although four teeth are shown, other numbers of teeth can also be used. Each tooth 104a through 104d is angled relative to the plane of a lower flange 100. Each of the teeth 104a through 104d includes two perpendicular sides 106 and a flat free end 108. These sides 106 may be slightly angled due to molding draft. The companion tape reel (not shown) has an identical structure.

FIG. 9 is a side, cross sectional view of the tape reel 102 assembled between a cassette base 80 and a cassette cover 110. As shown, the tape reel 102 includes the hub 99, an upper flange 112 and the lower flange 100. Tape 113 is wound between the upper flange 112 and the lower flange 100. The lower flange 100 can be separate from or integrally molded of the hub 99 as known in the art. Alternatively, the tape reel 102 can be in the form of a one piece tape reel as described in Assignee's currently pending U.S. patent application Ser. No. 442,167; entitled "One Piece Tape Reel."

The view in FIG. 9 is taken with the video cassette 114 in a tape player recorder (not shown). Locking is achieved by a relationship between the base's ratchet rings and 82, 84 and the hub teeth 104a–104d located on the chamfered ring 98. The hub teeth 104a–104d are able to ride across the gradually sloped teeth 88, 94 of the ratchet rings 82, 84, but are restricted from moving back by the abruptly sloped surfaces 90, 96. The chamfered ring 98 centers the hub 99 into its complementary ratchet ring 82, 84 by down pressure from the reel leaf spring 116.

However, as shown in FIG. 9, spindles of the tape player/recorder enter the hubs 99 and push the tape reels 102 upwardly against the biasing force of the reel leaf spring 116. When the tape reel 102 is moved upwardly, the locking engagement between the plurality of teeth 104a through 104d and the ratchet rings 82, 84 is disengaged.

Thus, in contrast to the conventional reel locks, with which despooling can still occur during locking as described above, the present invention allows the reels to move in the tape winding directions A, B, even in the locked position, to take up any despooling or slackening. Once the tape is truly taut, the reels no longer move in directions A, B. However, movement in the reverse directions is always prevented by the ribs, teeth, etc., described above.

An added benefit of this invention is that the various walls/receptacles usually required at the rear, central area of the cassette for receiving a movable, multi-piece reel lock, are no longer necessary. This minimizes molding complexity, and saves raw materials. It is noted, however, that due to industry standards for tape players/recorders, requiring a pin for actuating a movable reel lock, an opening 36 must still be formed at the rear of the cassette base to allow the pin free movement.

The above-described invention has been shown to be of the type intended for use in video player/recorders. However, the invention can be similarly applied to tape cassettes for use in audio or other recording and/or reproducing apparatus, if desired.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A tape cassette to be received by a tape player/recorder, comprising:
   (a) a cover;
   (b) a base;
   (c) a pair of tape reels mounted for biased rotation between the cover and base;
   (d) tape wound between the tape reels; and
   (e) means formed integrally of one of the cover and base and of the tape reels, for preventing despooling of the tape, when the tape cassette is not received by the tape player/recorder,
   wherein the means for preventing despooling includes
   a flange formed on each tape reel, having on an outer circumference thereof a plurality of teeth, and the cassette base including a plurality of vertical, slanted ribs and a horizontal, slated rib, wherein the teeth of the flange are able to move past the ribs in one direction, but are prevented from moving past the ribs in the opposite direction.

2. The tape cassette as recited in claim 1, wherein each vertical rib includes a first slanted surface, a second, flat surface parallel with a cassette wall adjacent thereto and a third flat surface perpendicular to the second surface and the wall, and
   wherein the horizontal rib has a first, slanted surface, a second flat surface parallel with the base and a third flat surface perpendicular, to the base.

3. A tape cassette as recited in claim 2, wherein the plurality of teeth project beyond and below an annular skuff rib.

4. The tape cassette as recited in claim 3, wherein the tape reels are biased by a reel leaf spring extending between the cassette cover and the tape reels.

5. A tape cassette to be received by a tape player/recorder, comprising:
   (a) a cover;
   (b) a base;
   (c) a pair of tape reels mounted for biased rotation between the cover and base;
   (d) tape wound between the tape reels; and
   (e) means formed integrally of one of the cover and base and of the tape reels, for preventing despooling of the tape, when the tape cassette is not received by the tape player/recorder,
   wherein the means for preventing despooling includes
   a hub on each tape reel including a lower, chamfered locking ring of ramped teeth, and
   the cassette base including a corresponding, angled ratchet ring of ramped teeth,
   wherein rotation of the tape reels in one direction is allowed, but not in the opposite direction.

6. The tape cassette as recited claim 5, wherein, when the tape cassette is not received by the tape player/recorder, each tape reel is restricted to rotate in one direction only by the hub teeth able to ride across the ramped teeth of the ratchet ring, and are restricted from moving in an opposite direction, and
   wherein, when the cassette is received by the tape player/recorder the hubs are centered and lifted, allowing free rotation of the tape reels.

7. The tape cassette as recited in claim 5,
   wherein a first ratchet ring includes a plurality of teeth pointed in a clockwise direction, each tooth including a gradually sloped surface and an abruptly sloped surface, and
   wherein a second ratchet ring includes a plurality of teeth extending in a counter clockwise direction, each tooth including a gradually sloped surface and an abruptly sloped surface.

8. The tape cassette as recited in claim 7, wherein the angle of each gradually sloped surface is about 10° relative to the cassette base plane.

9. The tape cassette as recited in claim 8, wherein each tape reel includes at the bottom thereof a hub locking ring in the form of an annular projecting member including a plurality of teeth, each tooth being angled and including two perpendicular sides and a flat free end.

10. The tape cassette as recited in claim 9, wherein the annular projecting member is chamfered to provide self centering of the hub in the ratchet ring.

11. The tape cassette as recited in claim 9, wherein locking is achieved by cooperation between the ratchet rings and the hub teeth located on the locking rings, wherein, the hub can rotate in one direction only when the hub teeth ride across the gradually sloped surfaces but are restricted from moving in the opposite direction by the abruptly sloped surfaces.

* * * * *